(12) United States Patent
Saitoh

(10) Patent No.: US 6,319,398 B1
(45) Date of Patent: Nov. 20, 2001

(54) DEGASSING UNIT

(75) Inventor: Toshinori Saitoh, Tokyo (JP)

(73) Assignees: Micro Electronics Inc.; Moleh Company Limited, both of Tokyo (JP)

( * ) Notice: Subject to any disclaimer, the term of this patent is extended or adjusted under 35 U.S.C. 154(b) by 0 days.

(21) Appl. No.: 09/534,142

(22) Filed: Mar. 23, 2000

(30) Foreign Application Priority Data

Mar. 26, 1999 (JP) .................................................... 11-84376

(51) Int. Cl.⁷ .................................................... B01D 15/08
(52) U.S. Cl. .................. 210/198.2; 210/656; 210/188
(58) Field of Search .................................... 210/656, 188, 210/198.2; 95/46; 96/6, 194, 219

(56) References Cited

U.S. PATENT DOCUMENTS

| | | | |
|---|---|---|---|
| 5,183,486 | * 2/1993 | Gatten | 210/198.2 |
| 5,275,723 | * 1/1994 | Greenley | 210/198.2 |
| 5,290,340 | * 3/1994 | Gatten | 210/198.2 |
| 5,393,420 | * 2/1995 | Hutchins | 210/198.2 |
| 5,393,434 | * 2/1995 | Hutchins | 210/198.2 |
| 5,407,569 | * 4/1995 | Greenley | 210/198.2 |
| 5,980,742 | * 11/1999 | Saitoh | 210/198.2 |
| 6,228,153 | * 5/2001 | Saitoh | 210/198.2 |

* cited by examiner

Primary Examiner—Ernest G. Therkorn
(74) Attorney, Agent, or Firm—Lackenbach Siegel Marzullo Aronson & Greenspan

(57) ABSTRACT

To provide a degassing unit having a wide range of flow speed, high-efficiency compactness in size, this degassing unit consists of both a degassing module composed of a gas permeable flat-shaped tube 201 wound around the internal vacuum space 401 and a vacuum chamber containing this flat tube, and by flowing an eluent through the flat tube 201 which constitutes the degassing module, gaseous components dissolved in the eluent can be transpired from the flat tube 201 to the vacuum chamber accommodating the internal vacuum space 401 and the external vacuum space 402 and 403, thus being well removed.

3 Claims, 13 Drawing Sheets

Round tube

Flat tube

DEGASSING UNIT

BACKGROUND OF THE INVENTION

1. Technical Field

This invention relates to a degassing unit, particularly that for high performance liquid chromatography, which makes it possible to perform a fast and precise eluent (solvent) delivery yet at a very small quantity by removing gaseous components dissolved in eluent (solvent) to be separated or analyzed with a liquid chromatograph.

2. Background Art

There is a tendency that high-speed (high-precision) liquid chromatography (hereinafter called HPLC) used to separate compounds in a given sample is made more and more highly accurate.

Usually in this type of HPLC, an eluent drawn from a reservoir by an eluent (solvent) delivery pump is delivered via a sample injection valve to a detection means including a separation column.

Shown in FIG. 15 is a schematic diagram explaining the configuration of HPLC. An eluent 2 in a first reservoir 1 (an eluent containing vessel) is drawn up via a pipe 3 by a pump 5 and is degassed through a degassing unit 4, and then is sent to a sample injection valve 6 (an auto sampler), to a column 7 and to a detector unit 8. The eluent delivered from the detector unit 8 is thrown out as a waste eluent 10 to a second reservoir 9. The arrow marks show the direction of the eluent delivery.

Data detected by the detector unit 8 are transferred to a data processing unit 11, wherein they are processed as required and is provided and stored in a visual form or a computer processable data form.

The column 7 is accommodated in an isothermal oven 7A to prevent the influence of external temperature. The pump 5 and the sample injection valve 6 are controlled by a system controller 12.

The degassing unit 4 installed before the pump 5 insures a stable eluent delivery and an accurate analysis by removing gases dissolved in the eluent 2 which is drawn up from the first reservoir 1 by the pump 5.

Other components consisting of this kind of high performance liquid chromatography and the functionality of the whole system are well known. So, explanations on these details are omitted here in this file.

In high speed and high accuracy liquid chromatography systems (known as semi-micro HPLC and micro HPLC) which require high accuracy in delivering the eluent under a high pressure yet at a very small quantity, it is common to install the degassing unit 4 on the inlet side of the eluent delivery pump 5 in order to insure the eluent delivery stability of the eluent delivery pump 5.

The purpose to install this type of degassing unit is to remove unnecessary gases dissolved in the eluent. The material used for degassing is a polytetra-fluoro-ethylene (PTFE) tube that is inactive to the eluent used yet good in eluent permeability. By flowing the eluent through this tube (hereinafter called PTFE tube or simply tube) and by reducing the pressure outside the tube, gaseous components dissolved in the eluent can be removed.

The stable micro eluent delivery is insured only because the eluent pump draws the eluent from which gaseous components are removed, and dispenses it.

Capillary electrophoresis chromatography (CEC) is a technology that is expected to be the next generation HPLC. This HPLC does not require an eluent delivery pump, but requires a degassing unit.

In the CEC type HPLC the eluent is transferred by the electro-osmosis flow that is generated by applying a high voltage to the column. When the high voltage is applied, the eluent is heated by joule heat, causing the temperature to rise. If oxygen (air) is dissolved in the eluent, bubbles are generated by this heat.

If bubbles are generated in the capillary column, no electric current is flown, thus making the separation impossible. The amount of eluent used in the CEC type HPLC is very small and is far smaller than that used in semi-micro HPLC. Consequently, a high-performance degassing unit that allows even smaller quantities is required.

FIG. 16 is a schematic cross section showing an example of a conventional degassing unit that uses a cylindrical capillary tube type degassing module. As explained in FIG. 15, the eluent in the first reservoir 1 is drawn via a pipe 31 by the eluent delivery pump 5. The degassing unit 4B is mounted on the pipe line 31 before the eluent delivery pump 5.

In the case of the degassing unit 4B a degassing module 16 is installed inside a vacuum chamber 13, whose air is evacuated by a vacuum pump 15, and the eluent delivery pump 5 is connected to an outlet pipe 41 of the vacuum chamber 13.

The degassing module 16 consists of gas permeable films made of a number of polytetra-fluoro-ethylene (PTFE) capillary tubes, both ends of which are bundled by multi-connectors 16a and 16b. When the eluent passes through the PTFE tubes, gases dissolved in the eluent are extracted to the vacuum chamber 13, thereby preventing gaseous bubbles from generating in the eluent delivery pump 5 while the pump 5 is drawing up the eluent.

If an attempt is made to change this degassing unit to that for micro quantity delivery, problems arise in both an internal volume of the degassing module and a structure of the module.

The internal volume of the degassing module has a standard capacity of 12ml. This volume is too large to apply to the semi-micro HPLC systems.

As the pump flow speed in semi-micro HPLC is 0.1 to 0.2 ml/min., it takes 60 to 120 minutes even in simple calculation for the eluent to pass through the degassing module. This is a considerably long time as the time of chromatographic analysis.

On the other hand, the structural problem of the degassing module is as follows. PTFE tubes, a typical degassing module material, are used in a bundle of 18 tubes with a length of 2.5 m. The eluent is distributed to each tube and flows through it.

As every tube is not the same in flow resistance, speeds for the eluent to pass through the tubes are different according to the tubes. Because of the differences of these flow speeds, the time required for the eluent to be replaced completely inside the degassing module is longer than such 60 to 120 minutes as previously mentioned.

In order to resolve such structural problem of the degassing module, I (inventor) propose the following degassing unit.

FIG. 17 shows a schematic diagram of a degassing module based on a thin film method. This figure is shown to explain another construction example of a conventional degassing unit. FIG. 18 is a cross section view of FIG. 17 taken along the line A—A in FIG. 17.

100 in FIG. 17 shows the degassing module that is a component of the degassing unit. This degassing module is accommodated in a vacuum chamber (closed console), but the illustration of the vacuum chamber is omitted here in this figure.

In FIGS. 17 and 18, this degassing module 100 is composed of two PTFE sheets 101a and 101b with a spacer 103 placed on their fringes as well as two stainless steel mesh sheets 102a and 102b put on the two PTFE sheets 101a and 101b, respectively. They are held by upper and lower holding frames 106 and 107, and are fastened in one unit by tightening bolts 108.

By means of this tightening, the fringes of the two PTFE sheets are closely contacted and form a hollow enclosure to create an internal space between them. The hollow enclosure is provided with an eluent feeding-in inlet 104 and an eluent feeding-out outlet 105 on one side (upper side of the figure) of the PTFE sheet (101a).

The eluent feeding-in inlet 104 is equipped on one short side of the rectangular PTFE sheet 101 a and the outlet 105 on its other short side, respectively, thereby securing an eluent flowing pathway between the two ports which contributes to the degassing of the eluent.

The inlet 104 and the outlet 105 are composed each of a connector 109 and its fastening part 110 both of which are fitted to an opening created by getting through the PTFE sheet 101a and the stainless steel mesh sheet 102a. Preferably, the connector 109 should be made of PTFE resin, but any material may be used if it is of organic solvent proof.

The PTFE sheet is supported by the mesh sheet of high precision stainless steel fibers of small diameter. So, it is possible to use even a thin and mechanically weak film of the PTFE sheet. As the degassing effect is in inverse proportion to the thickness of the film, the degassing efficiency can be much more improved (than with the degassing module explained in FIG. 16) by making the film thin and supporting it with the stainless steel mesh sheet.

The eluent is introduced from the inlet 104 and is transferred through the narrow internal space formed by the two PTFE sheets 101a and 101b toward the outlet 105. This eluent transfer is performed by the pumping operation of the pump connected via a pipe to the outlet 105.

While the eluent is transferred from the inlet 104 to the outlet 105, it spreads in the internal space formed by the two PTFE sheets 101a and 101b and the dissolved gaseous components are transmitted to the vacuum chamber through the walls of the PTFE sheets 101a and 101b by decreasing the pressure of the vacuum chamber by means of a vacuum pump which is not shown in the figure.

In the case of the degassing module used in this type of degassing unit, the PTFE sheets are held in the vacuum chamber and the PTFE sheet holders are comparatively large. This makes it difficult to make the area of the PTFE sheets large. Consequently, the upper limit of the degassable flow speed of the degassing unit is low, thus increasing restrictions for practical use.

As the connectors for the eluent introducing port (inlet) and the eluent discharging port (outlet) are directly provided in the PTFE sheets, it is not possible to make the gap between the two PTFE sheets smaller than a certain gap (for instance, 0.8 mm). Thus, the fact that the efficiency of the degassing module cannot be increased is the cause for the inability of increasing the flow speed.

In order to adapt the semi-micro HPLC systems or micro HPLC systems to the high flow speeds and high efficiency, the volume of the degassing unit must be made much smaller (for example, one fifth) than that of existing degassing units.

In addition, the efficiency of eluent replacement of the degassing module for the degassing unit must be improved. When the degassing unit is used for semi-micro HPLC, it is desirable that the flow rate capacity of the degassing module can cope with, at least, 1 ml/min. The degassing module with this improved capability can cope with the analysis conditions of the conventional HPLC systems.

In consideration of satisfying the above-mentioned conditions, it is impossible to realize the anticipated performance merely by making the internal volume of the degassing module with the conventional PTFE tubes smaller by one fifth. Also, it is difficult for the flat film type degassing module using the PTFE sheets to cover the analysis region of the conventional HPLC systems.

SUMMARY OF THE INVENTION

The purpose of this invention is to provide a degassing unit that ensures a high range of flow speed, high efficiency and compactness in size by resolving the various problems that the conventional technologies used to have.

To accomplish the above-stated purpose, this invention employs a degassing module with a flat tube which is made flat-shaped from a round PTFE tube of a comparatively large diameter and is named "Flat Micro Tube".

From the standpoint of the flow capacity of the degassing module, the round capillary tube type degassing module is effective, but when considering the maximum attainable efficiency of degassing, the flat film type module is advantageous. Thus, invented was this Flat Micro Tube module having the merits of the both types.

A representative configuration of this invention is as follows.

(1) This invention is a degassing unit to be used for high performance liquid chromatography, which draws an eluent from a reservoir by an eluent delivery pump, removes gaseous components dissolved in the eluent, delivers the degassed eluent via a sample injection valve to a detection means including a separation column, and is installed between the eluent delivery pump and the eluent reservoir.

This invention is characterized by the fact that the degassing unit consists of both a degassing module composed of a gas permeable flat-shaped tube and a vacuum chamber containing this flat tube and that by flowing the above-mentioned eluent through the flat tube which is a main component of the degassing module, gaseous components dissolved in the eluent can be transpired from the flat tube to the vacuum chamber, thus being well removed.

(2) This invention is also characterized by the fact that the degassing unit is composed of an array of a spirally but flatly wound flat-shaped tube, two pairs of mesh sheets with which one pair holds one side of the arrayed flat tube winding in between and the other holds the other side of it, a degassing module provided with frames with which said mesh sheets and said array of the flat tube are fixed in a given form, and a vacuum chamber that accommodates the degassing module.

(3) This invention is also characterized by the fact that the degassing unit is configured in such a manner that a first sub-module (one side of the flat tube winding) and a second sub-module (the other side of it) both of which consist of the flat tube arrayed between the two mesh sheets, and two frames provided on both sides of and around the mesh sheets are fixed as an integrated component in a given distance with spacers, and that the flat tube consists of a single tube wound around a first sub-frame and a second sub-frame, and these sub-modules are accommodated in the vacuum chamber.

The flat tube referred to in (2) and (3) above can be a tube having a flat cross section in itself, but it is realistic to use a round cross-section tube, which is deformed into a flat cross section by the compressing force of the two mesh sheets fixed by the frames.

The flat tube is spirally wound in a flat form between the first sub-module and the second sub-module, and each of the first sub-module and the second sub-module is fastened by the two frames so as to retain the shape of the flat tube using sub-spacers, and then the first sub-module and the second sub-module are fastened in a given space as an integrated component via the spacers.

It is desirable to use common bolts that pass through the fringes of the four frames in order to fasten each of the first sub-module and the second sub-module as well as fasten the both sub-modules altogether as an integrated component.

FIGS. 1(a) and 1(b) show conceptual figures of the flat tube that constitutes the degassing module comprising the degassing unit of this invention. FIG. 1(a) illustrates the flat tube and FIG. 1(b) illustrates the basic principle of the arrangement structure of the flat tube.

The tube used for the degassing module that constitutes the degassing unit of this invention is flat in its cross section as shown in FIG. 1(a). To make the flat tube it is common to use a large-diameter round tube and smash it into the flat shape.

The flat tube 201 is spirally wound in a flat form in the vacuum chamber which is not illustrated here in this figure, in such a way that it forms an internal space 401. In the vacuum chamber both external spaces 402 and 403 are formed on the side opposite to 401. Gases that are transpired from the flat tube disperse to the internal vacuum space 401 and the external vacuum spaces 402 and 403.

Next, effects of the basic composition of this invention is described. When considering the degassing efficiency, the ratio RS (internal area/eluent volume=S/V) of the surface area S of the degassing module against the internal volume V of the degassing module, which performs degassing from the eluent passing through it, becomes an important parameter.

Theoretically, the more RS is, the better the degassing efficiency is. In particular, this is an important parameter to determine the degassing capacity.

FIG. 2 is a characteristic figure of SN that compares the ratio RS of the channel (eluent flowing pathway) of the degassing unit of the conventional capillary tube type (round tube type) degassing module against that of the sheet (film) type degassing module. D in the figure represents the inner diameter (in mm), Z represents the gap (in mm) between internal walls of the sheets, S the surface area (in cm$^2$) of the degassing module, and V the internal volume (in cm$^3$) of the module, respectively.

In the case of the tube type module, given D mm for the inner diameter of the module, RS is 40/D. In the case of the sheet module, on the other hand, given z mm for the gap between the sheets, RS is 20/z.

FIG. 3 is a diagram to explain the calculation of the surface area vs. the eluent volume (S/V) for the round capillary tube type degassing module. L represents the length (in mm) of the round tube, D the inner diameter of it, and R the inner radius of it, respectively.

The calculation formula is;

$$S = 2\pi rL \times 10^{-2} \text{ (cm}^2\text{)}$$

$$V = \pi r^2 L \times 10^{-3} \text{ (cm}^3\text{)}$$

$$S/V = (2\pi rL \times 10^{-2})/(\pi r^2 L \times 10^{-3})$$

$$= 20/r$$

$$= 40/D$$

Given for reference only are such actual figures in usual case as r=0.3 mm and L=2,.5×10$^3$×18 (mm), as this type module consists of a bundle of 18 tubes with 2.5 m in length.

FIG. 4 is a diagram to explain the calculation of the surface area vs. the eluent volume (S/V) of the thin-film sheet type degassing module. Here, X is the sheet width (in mm), Y its length (in mm), and Z the gap (mm) between the sheets, respectively.

The calculation formula is;

$$S = X \times Y \times 10^{-2} \times 2$$

$$V = X \times Y \times Z \times 10^{-3}$$

$$S/V = (X \times Y \times 10^{-2} \times 2)/(X \times Y \times Z \times 10^{-3})$$

$$= 20/Z$$

The comparison of the round capillary tube type module and the thin film sheet type module from the above calculations shows that the round tube module is about twice as good in efficiency as the sheet type module.

FIG. 5 is a characteristic figure of (SV) that compares the RS ratio of the round tube type degassing module against the flat tube type degassing module of this invention. S1 represents the cross section area (mm$^2$) of the round tube, 2r its inner radius (mm), S2 the cross section area of the flat tube (mm$^2$), and d its gap (mm) between the inner walls, respectively.

As the surface areas of the two modules are the same, the RS ratio of the two modules is the ratio of the cross section areas of the two modules.

FIGS. 6(a) and 6(b) are diagrams to explain the calculation of the surface area vs. the eluent volume (S/V) of both the round tube type degassing module and the flat tube type degassing module. FIG. 6(a) shows a cross sectional view of the round tube type module and FIG. 6(b) the flat tube type module, respectively.

In the case of the round tube module as in FIG. 6(a), the cross section area is $S1=\pi r^2$ and the cross section perimeter $L1=2\pi r$.

In the case of the flat tube module (b), the cross section area $S2=\pi(d/2)^2+Ld$ and the cross section perimeter $L2=2\pi(d/2)+2(L+d)$.

As L1 is equal to L2 (L1=L2),
$2\pi r=2\pi(d/2)+2(L+d)$ $$L=\pi r-\pi d/2-d \qquad (1)$$

Given the area ratio S1/S2=R, R=S1/S2

$$R = S1/S2$$

$$= \pi r^2/(1/4\pi d^2 + Ld)$$

$$= 4\pi r^2/(\pi d^2 + 4Ld)$$

When (1) is substituted, $$= 4\pi r^2/(4\pi rd - \pi d^2 - 4d^2) \quad (2)$$

If d is small enough, $$= r/d \quad (3)$$

From all the above,
RS (round tube)/RS (flat tube)

$$= S1/S2 = 4\pi r^2/(4\pi rd - \pi d^2 - 4d^2)$$

In the case of the flat tube in which the tube is made flat-shaped, the surface area that affects degassing does not change at all but only the internal volume changes. That is, the surface area is invariable but the internal volume decreases.

The RS ratio is largely dependent upon the gap d of the flat tube. The smaller d becomes, the larger the RS ratio becomes sharply.

In this connection, in the flat tube type module it is possible to greatly increase the RS ratio. In terms of the relationship between the internal volume and the surface area, the flat tube is far more advantageous than the round tube.

The important parameter for determining the upper limit of the degassing efficiency of the degassing unit is the gap d between the inner walls in the case of the flat tube type degassing module, and is the tube inner diameter D in the case of the round tube.

In connection with the above calculations, given 0.75 mm and 0.3 mm for the inner radius r with the gap d between the inner walls of the flat tube changed, shown in Table 1, Table 2 and Table 3 are the ratio of the length L2 of the cross-section circumference and the cross section volume S2 of the flat tube as well as the ratio of the cross section area S1 of the round tube and the cross section S2 of the flat tube.

TABLE 1

Results of calculation (for r = 0.75 mm)

| d | L2/S2 |
|---|---|
| 0.1 | 20.6 |
| 0.2 | 10.7 |
| 0.3 | 7.4 |
| 0.4 | 5.7 |
| 0.5 | 4.8 |
| 0.6 | 4.1 |
| 0.7 | 3.7 |

TABLE 2

Results of calculation (for r = 0.3 mm)

| d | L2/S2 |
|---|---|
| 0.10 | 21.8 |
| 0.15 | 15.2 |
| 0.20 | 12.0 |
| 0.25 | 10.1 |
| 0.30 | 8.8 |
| 0.35 | 8.0 |
| 0.40 | 7.5 |

TABLE 3

Results of calculation

| d | S1/S2 (r = 0.75) | S1/S2 (r = 0.3) |
|---|---|---|
| 0.1 | 7.75 | 3.27 |
| 0.2 | 4.01 | 1.80 |
| 0.3 | 2.77 | 1.33 |
| 0.4 | 2.16 | 1.125 |
| 0.5 | 1.8 | 1.02 |
| 0.6 | 1.56 | 1.00 |
| 0.7 | 1.39 | |
| 0.8 | 1.27 | |
| 0.9 | 1.19 | |
| 1.0 | 1.12 | |
| 1.1 | 1.07 | |
| 1.2 | 1.04 | |
| 1.3 | 1.01 | |
| 1.4 | 1.00 | |
| 1.5 | 1.00 | |

FIG. 7 is a diagram to explain the relationship between the gap d of the inner walls and the degassing efficiency for the flat tube type degassing module. The eluent flowing through the two PTFE films which consist of the flat tube inner walls 201 is considered to be in laminar flow having the parabola-shaped flow speed as shown in FIG. 7.

The mechanism to remove oxygen dissolved in the eluent under such eluentflow circumstances is considered to proceed in the following steps.

Step A:

Step A is such a state that oxygen is dissolved in the eluent, and oxygen evenly distributes in the gap.

Step B:

As the outside of the degassing module is vacuum, oxygen in the vicinity of the inside of the PTFE film is dissolved in the PTFE film, diffuses in the film and then goes out to the vacuum from the film outside surface. At that time, the density of oxygen in the vicinity of the film becomes low.

Step C:

Oxygen in the gap diffuses into the surface of the PTFE film according to its natural diffusion. Then, the density of oxygen becomes even again, getting similar to the state of Step A. However, the mean density of oxygen becomes smaller.

The above three steps are repeated while the eluent passes through the inside of the degassing module, thus causing the dissolved oxygen to diminish toward zero.

The shorter is the time required for the three steps, the more rapidly the oxygen density gets near zero.

In order to reduce the time required for these three steps, the channel gap (d) must be made small in the first place.

The time required for the dissolved oxygen to diffuse in the direction perpendicular to the direction of the eluent flowing in the channel gap can be estimated from the diffusion coefficient of the eluent. This time t is indicated by the following formula.

$$t = Q^2/K \quad Q: \text{distance (cm), K: diffusion coefficient cm}^2/\text{sec.}$$

From this equation, the gap for the dissolved oxygen to diffuse in the channel in one minute is obtained as follows.

$$Q = (Kt)^{1/2}$$

So, given t=60 sec. and a general eluent diffusion coefficient $K = 10^{-5}$ cm$^2$/sec., $$Q = 245 \, \mu m$$

The distance Q can be considered to be ½ of the channel gap. So, when the channel gap is 490 μm, the dissolved oxygen is able to evenly diffuse in one minute. If it takes 20 minutes for the eluent to pass through the degassing module, that means that the above three steps are repeated 20 times.

Considering that the removal rate by one step is more or less 20%, obtainable with ten steps repeated is the same removal rate as that by the conventional degassing units. Thus, if 20 steps are repeated, it makes the dissolved oxygen get near about zero. In practice, however, the size of the channel gap is also related to the flow resistance, so the channel gap d is set to 0.2 to 0.5 mm.

Next, described hereunder is the diffusion of dissolved oxygen that takes place when the PTFE film is used. The oxygen staying in the channel is dissolved into the PTFE film in the first place. Then, the dissolved oxygen diffuses into the vacuum side. Finally, the oxygen disperses in the vacuum.

The diffusion coefficient in the PTFE film is far smaller than that in liquid phase because it is in solid phase. It is possible, therefore, to reduce the time of diffusion in the PTFE film by making its thickness thinner.

Generally, the film thickness is about 250 μm. If this thickness is made thinner to about 150 μm, the time of diffusion can be reduced about 40%. As the diffusion coefficient largely depends upon temperature, it is possible to make the diffusion coefficient small by heating the PTFE film. In actual experiments, the diffusion coefficient could be made small to ½ by heating the film at 55° C., and it could be improved even to about ⅓ by adjusting the film thickness and temperature.

The density of the dissolved oxygen is presumed to get near zero ppm at a flow rate of 100 to 200 μl/min, which is used for semi-micro HPLC, by optimizing the setting of diffusion conditions for the PTFE film and the above-mentioned channel gap d.

In this way, the high efficiency yet compact type degassing unit becomes available by this invention.

The above explanations are based upon oxygen as a gaseous compound dissolved in the eluent (solvent). However, this invention can apply to the removal of not only oxygen but also various gaseous components dissolved in various eluents.

Furthermore, it is needless to state that this invention is not limited to the composition and configurations described in the above clauses, and allows to alter them unless it deviates from the concept of this invention stated throughout the descriptions of this file.

DETAILED DESCRIPTION OF PREFERRED EMBODIMENTS

Embodiments of the present invention are now described hereinafter with reference to the drawings.

Figure 1:
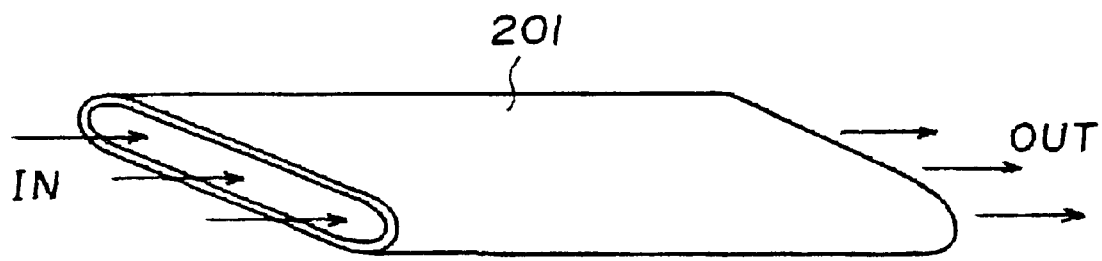
FIGS. 1(a) and 1(b) show conceptual figures of the flat tube that constitutes the degassing module for the degassing unit of this invention.
Figure 1:
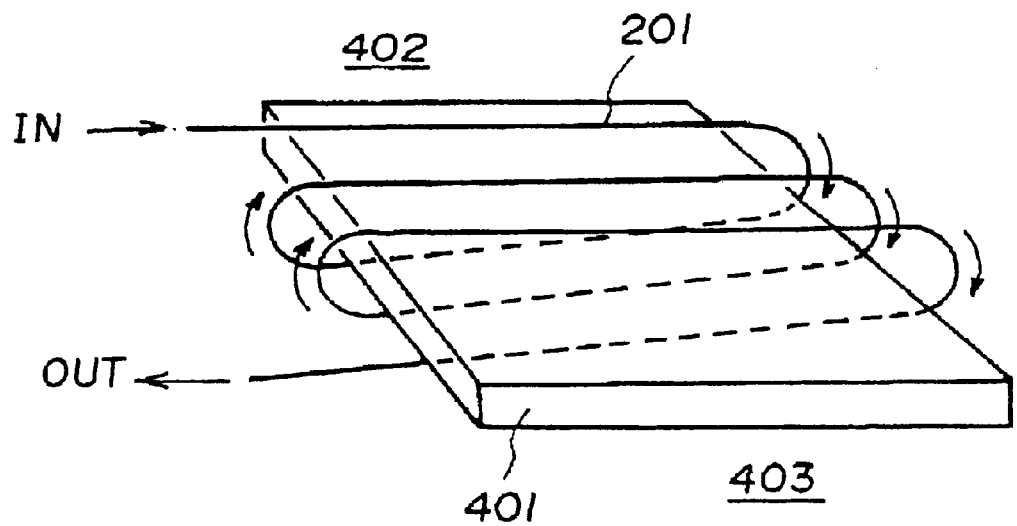
Figure 2:
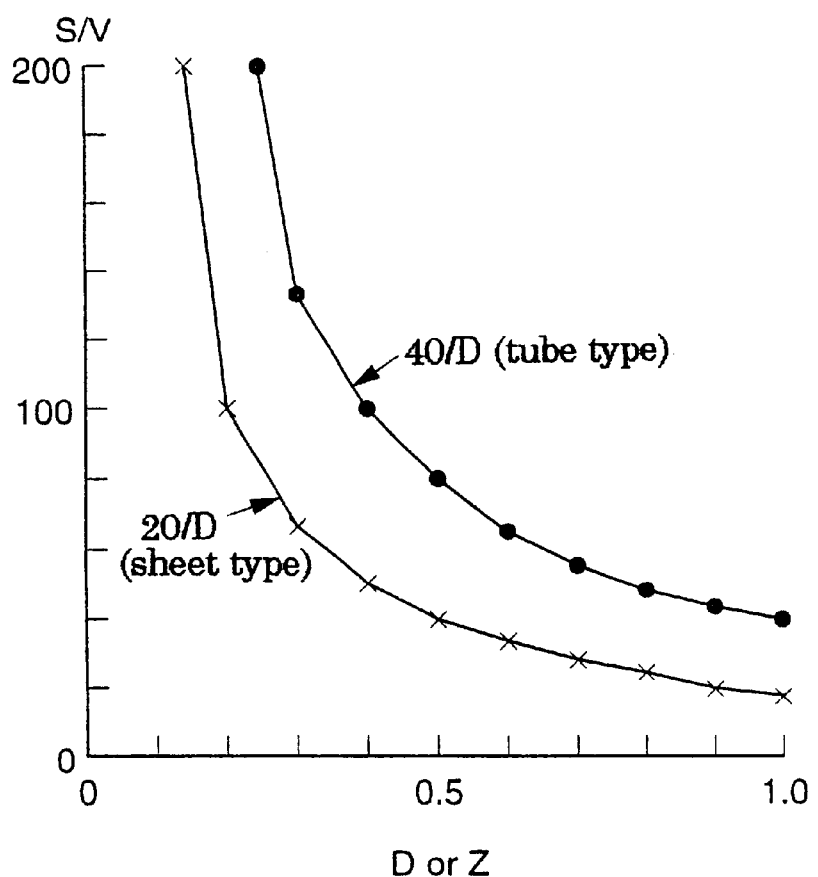
FIG. 2 is a graph showing a theoretical ratio of the surface area vs. the internal volume of degassing modules by the conventional flat film type and the conventional round capillary tube type.
Figure 3:
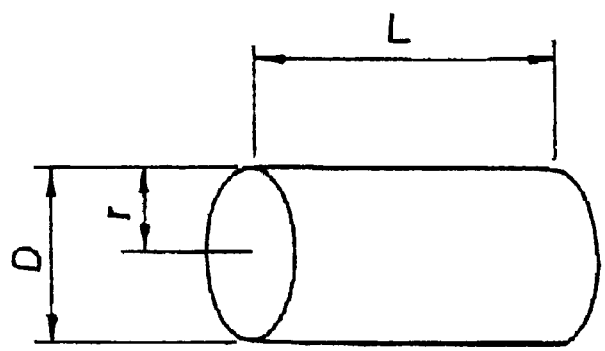
FIG. 3 is a diagram to explain the calculation of the surface area vs. the eluent volume (S/V) of the round capillary tube type degassing module.
Figure 4:
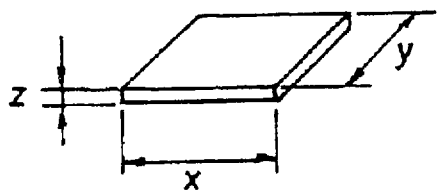
FIG. 4 is a diagram to explain the calculation of the surface area vs. the eluent volume (S/V) of the thin-film degassing module.
Figure 5:
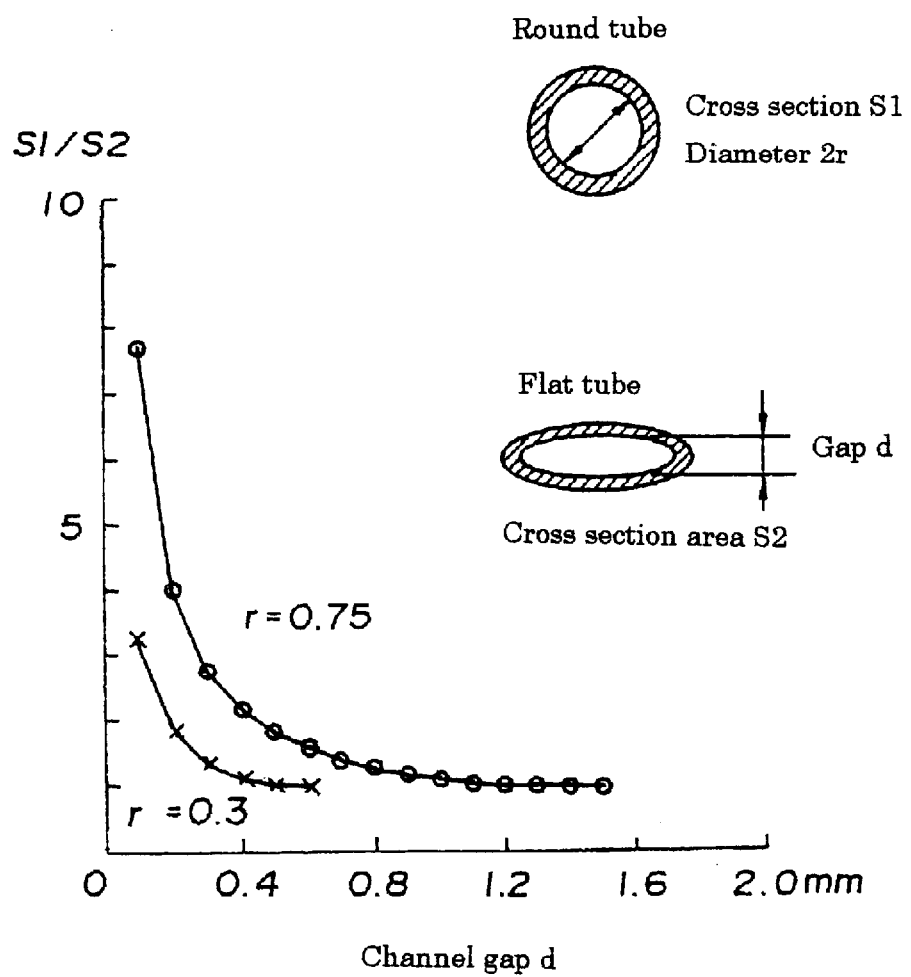
FIG. 5 is a characteristic figure of (S/V) that compares the RS ratio of the round capillary tube degassing module against the flat tube degassing module of this invention.
Figure 6:
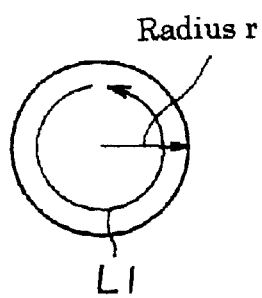
FIGS. 6(a) and 6(b) are diagrams to explain the calculation of the surface area vs. the eluent volume (S/V) of degassing modules by the round capillary tube type and the flat tube type.
Figure 6:
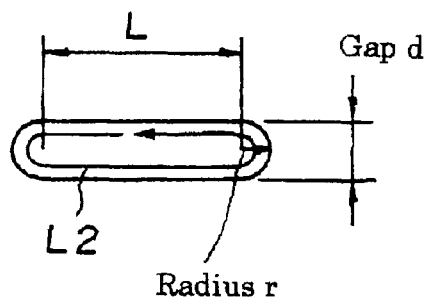
Figure 7:
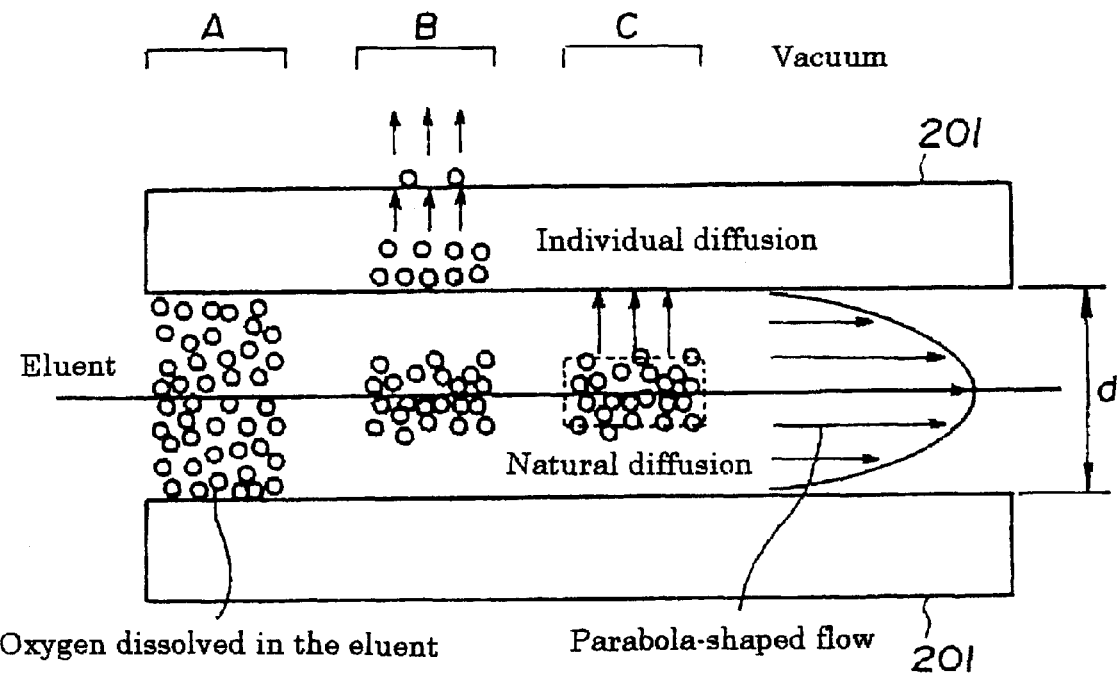
FIG. 7 is a diagram to explain the relationship between the gap d in the inner walls and the degassing efficiency for the flat tube degassing module.
Figure 8:
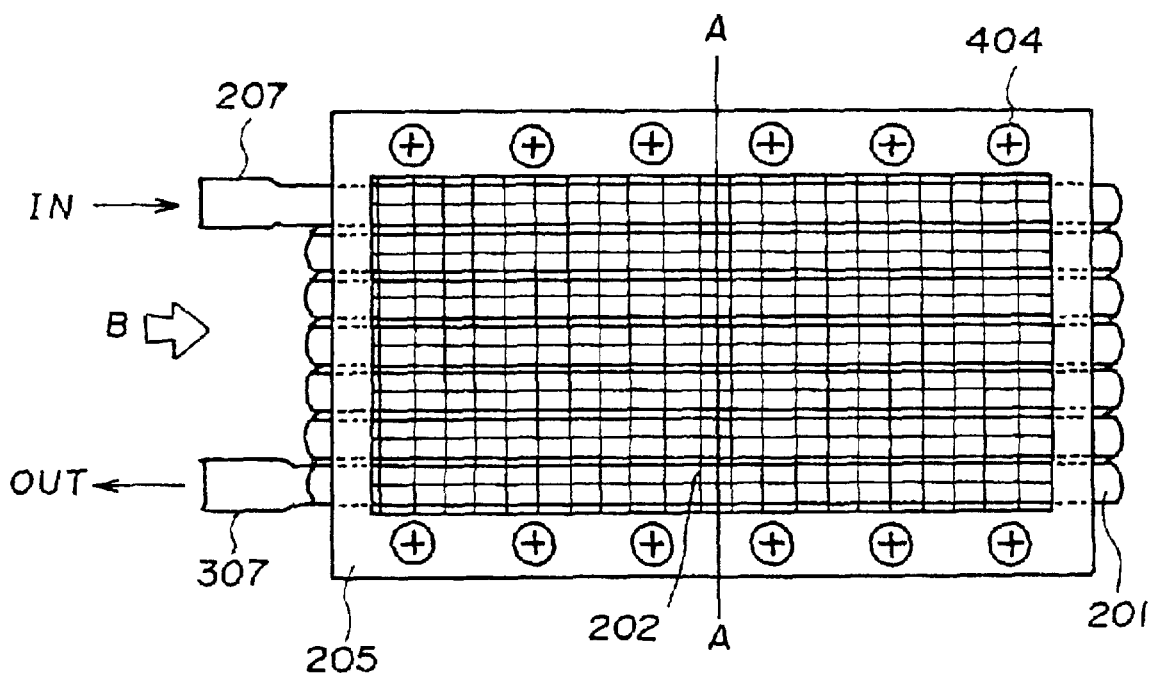
FIG. 8 is a perspective view to show a first embodiment of the degassing module that constitutes the degassing unit of this invention.
Figure 9:
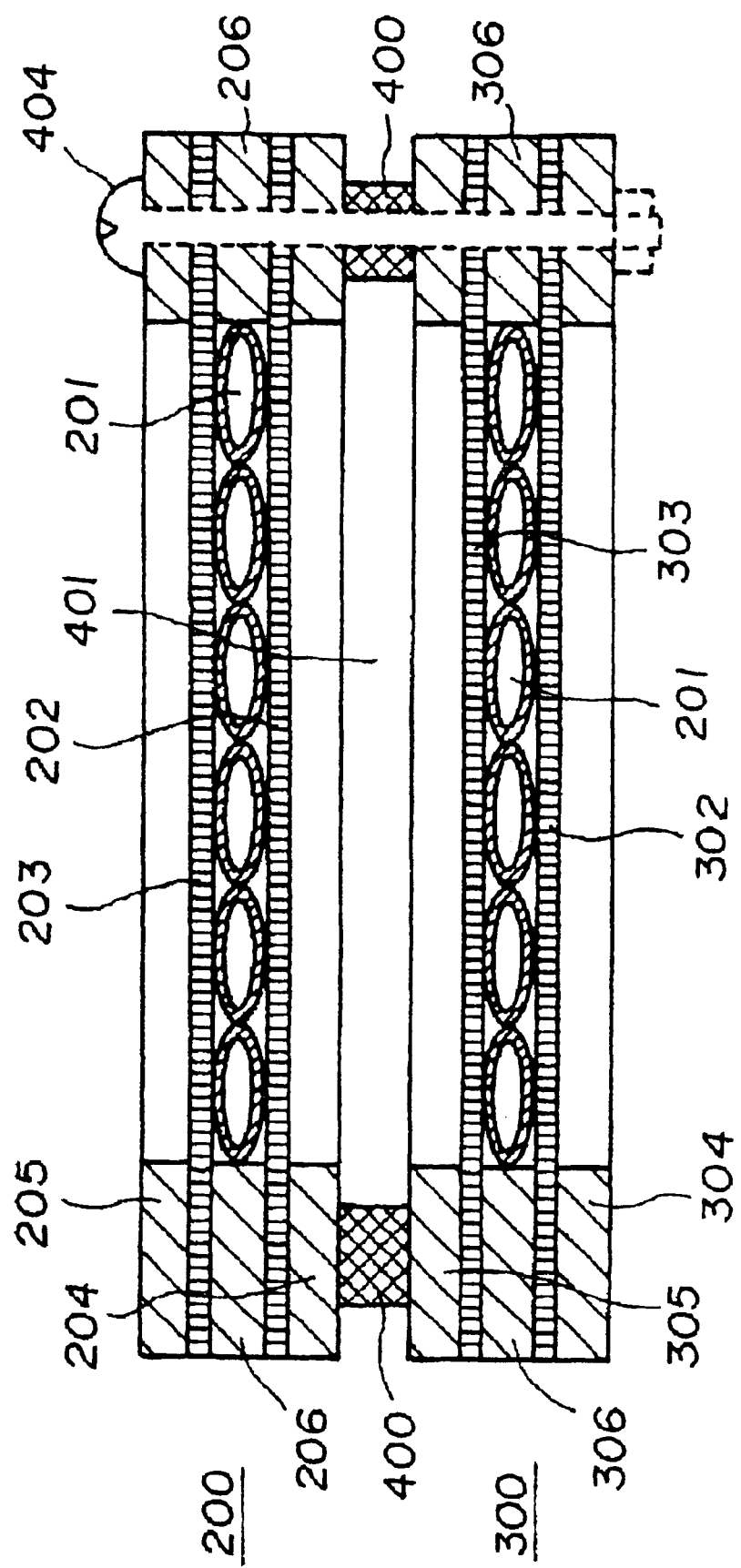
FIG. 9 is a cross sectional view taken along the line A—A of FIG. 8.
Figure 10:
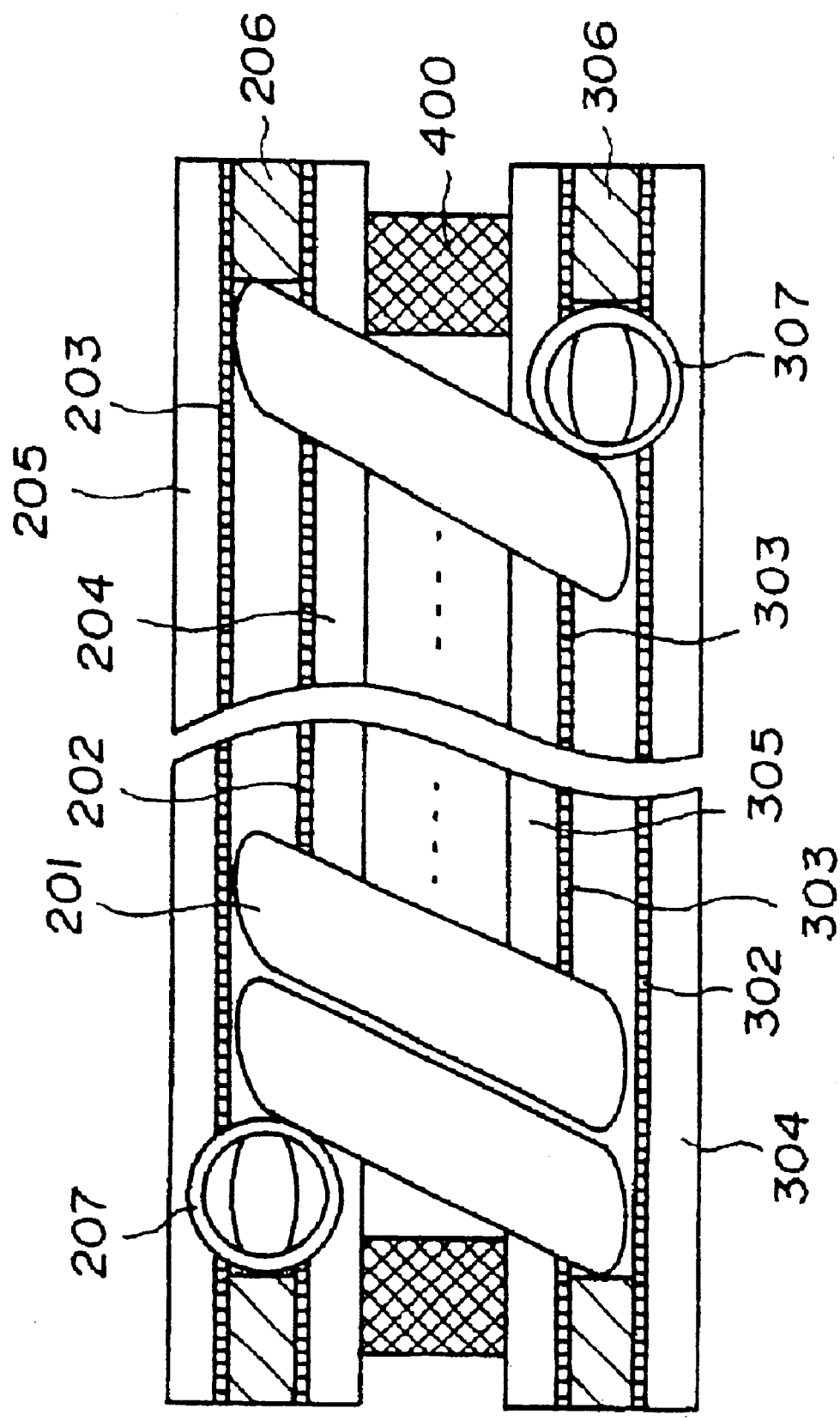
FIG. 10 is a front view seen from the direction of the arrow mark (→) B of FIG. 8.

FIG. 8 is a perspective view to show a first embodiment of the degassing module that constitutes the degassing unit according to this invention. FIG. 9 is a cross sectional view taken along the line A—A of FIG. 8. FIG. 10 is a front view seen from the direction of the arrow mark (→) B of FIG. 8.

Figure 11:
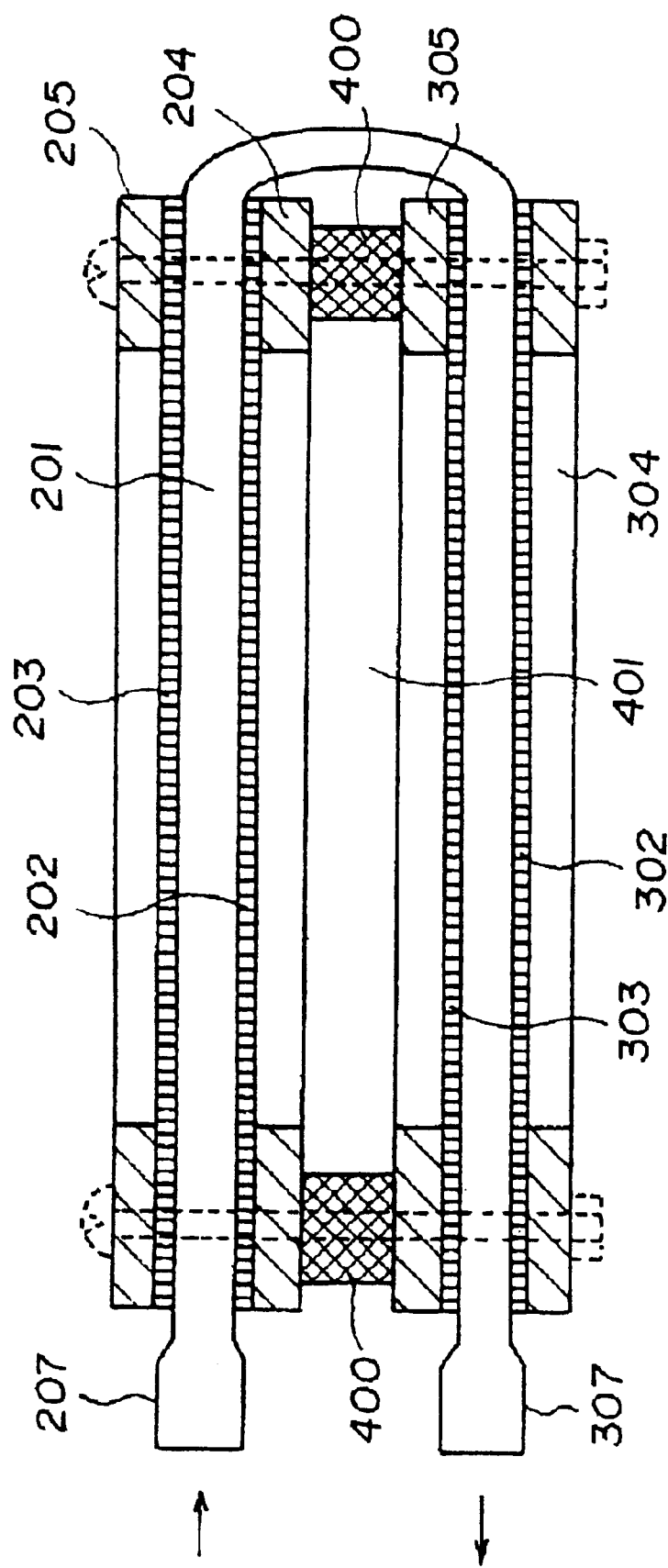
FIG. 11 is a schematic diagram to explain the arrangement of the flat tube in the first embodiment of the degassing module that constitutes the degassing unit of this invention.

FIG. 11 is a schematic diagram to explain the arrangement of the flat tube in the first embodiment of the degassing module that constitutes the degassing unit according to this invention.

The degassing module in this embodiment is configured by two sub-units (sub-modules) of the same structure arrayed back to back. A first sub-unit (sub-module) 200 and a second sub-unit (sub-module) 300 are the same in structure. The former is provided with an eluent inlet port 207 and the latter with an eluent outlet port 307.

Figure 16:
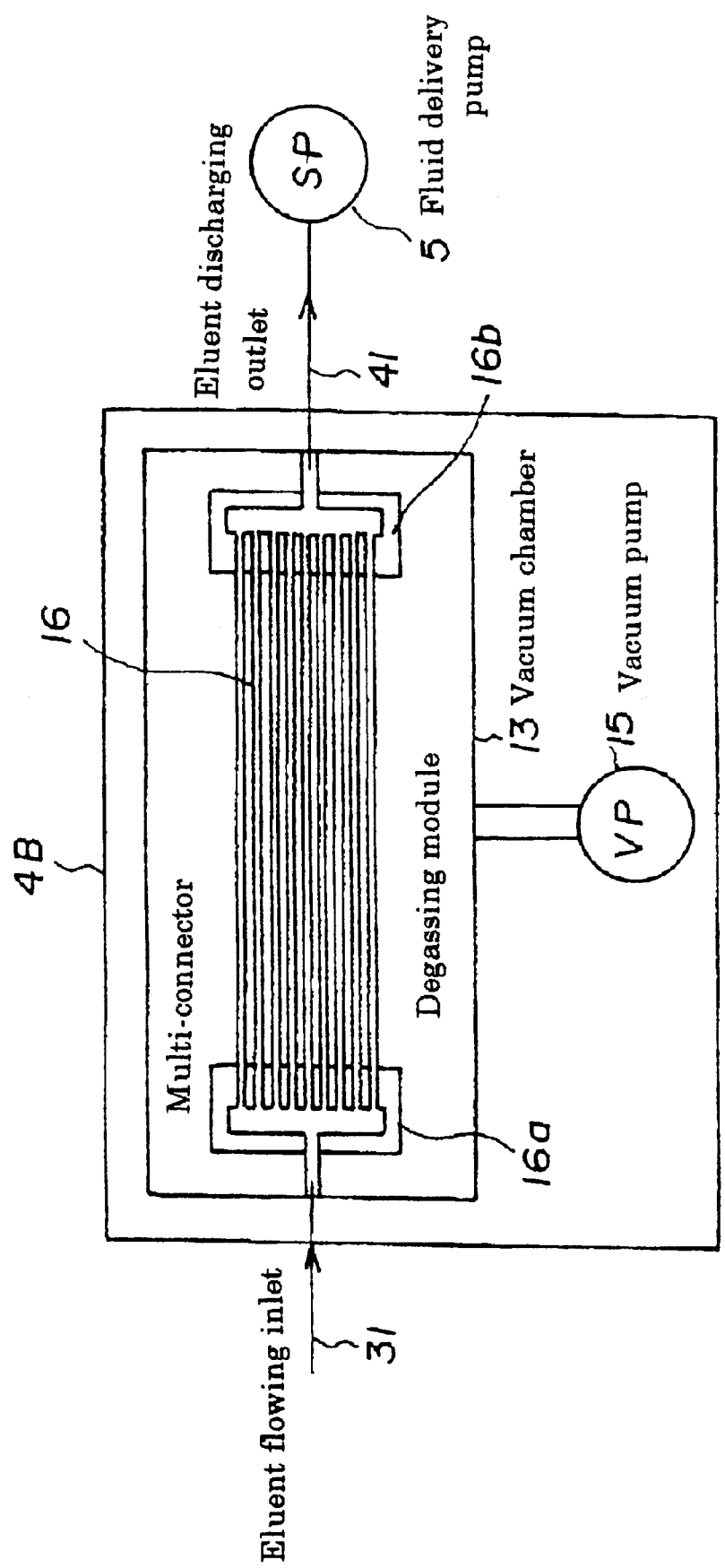
FIG. 16 illustrates a conventional degassing unit with a round capillary tube degassing module.

A flat tube 201 in the first sub-unit 200 is set in array as a spirally and flatly wound flat tube which leads to the second sub-unit 300. The first sub-unit is composed of the array of said flat tube, a mesh sheet 202 arranged on the side of an internal vacuum space 401 (existing between the two sub-units), a mesh sheet 203 on the side of an external vacuum space (a vacuum chamber 13 in FIG. 16), and frames (a lower frame 204 and an upper frame 205) which fasten the sheet meshes 202 and 203 as well as the array of the flat tube in a given form.

Similarly, the flat tube 201 in the second sub-unit 300 is set in array as a spirally and flatly wound flat tube which leads to the first sub-unit 200. The second sub-unit is composed of the array of said flat tube, a mesh sheet 303 arranged on the side of the internal vacuum space 401, a mesh sheet 302 on the side of the external vacuum space, and frames (a lower frame 304 and an upper frame 305) which fasten the sheet meshes 302 and 303 as well as the array of the flat tube in the given form. The shape of the flat tube in the flat-tube arrays that constitute the first sub-unit 200 and the second sub-unit 300 is kept by sub-spacers 206 and 306 inserted between the pair of the mesh sheets 202 and 203 and the other pair of the mesh sheets 302 and 303.

The first sub-unit 200 and the second sub-unit 300 are superposed at the lower frame 204 of the former and the upper frame 305 of the latter with a spacer 400, and are fastened by a plurality of bolts 404, creating the internal vacuum space 401.

A round-section tube which is spirally wound in the flat form between the first sub-unit 200 and the second sub-unit 300 is arrayed in such that the internal vacuum space is formed between the both sub-units. When the round-section tube is fastened with the frames 204 and 205 and with the frames 304 and 305, it is made flat and the flat shape is kept with the sub-spacers 206 and 306 inserted between the mesh sheets 202 and 203 and between the mesh sheets 302 and 303, respectively.

FIG. 10 shows how the first sub-unit 200 and the second sub-unit 300 are bridged by the flat tube that is spirally wound between the two sub-units. In this bridge portion, the flat tube 201 is arrayed obliquely from one sub-unit to the other. FIG. 11 is a schematic diagram in cross sectional view to simply show how the flat tube 201 is wound.

FIG. 10 and FIG. 11 show that one end of the flat tube (on the side of the first sub-unit) is an inlet port 207 of the eluent, and the other end of the flat tube (on the side of the second sub-unit) is an outlet port 307 of the eluent. At the inlet 207 and the outlet 307 the flat tube 201 is round in cross section (its original shape) and these ports are combined with connectors which connect pipes through which the eluent is fed from and is discharged to the outside.

Figure 12:
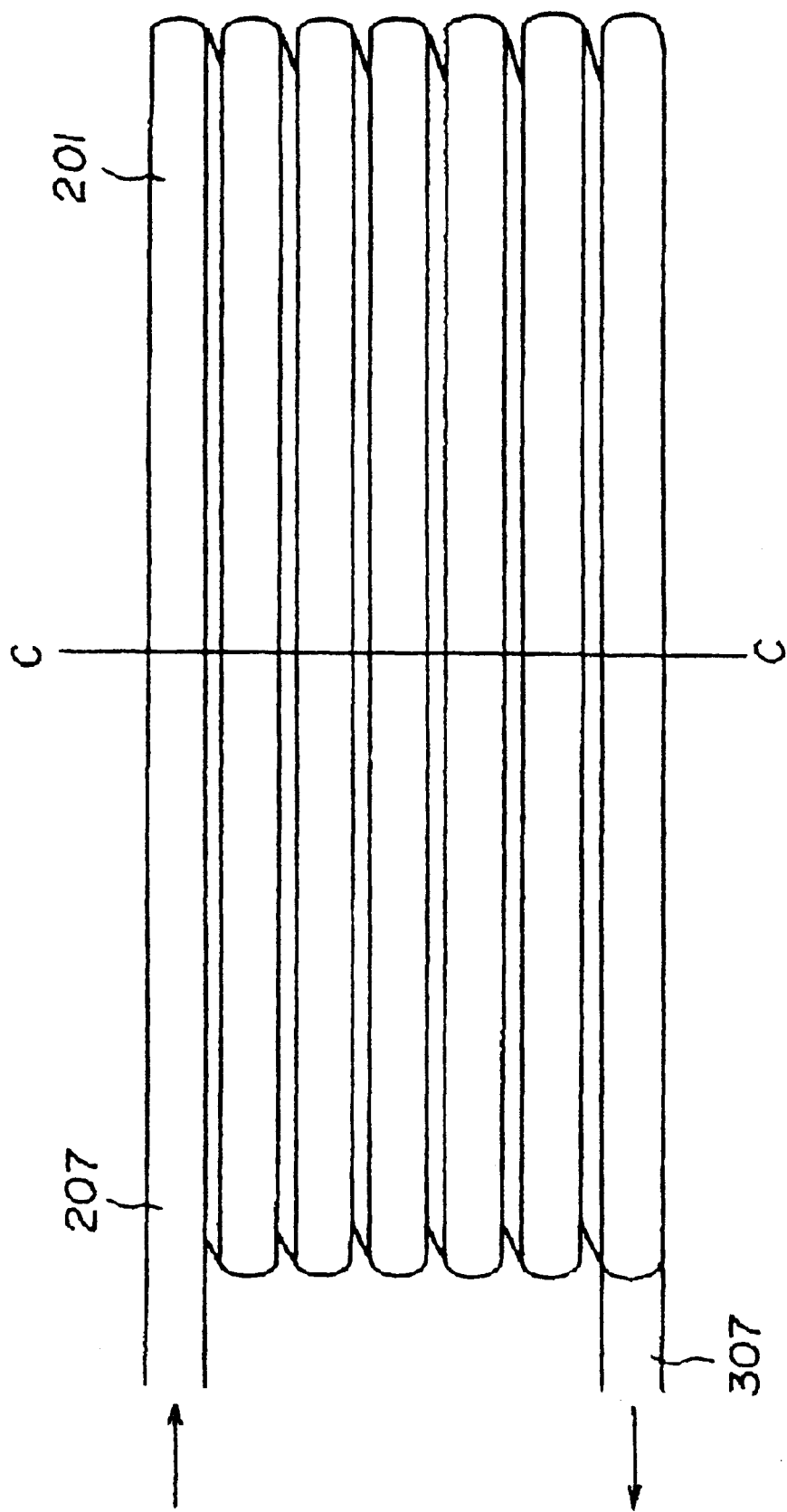
FIG. 12 is a plane view to show an array of the flat tube.
Figure 13:
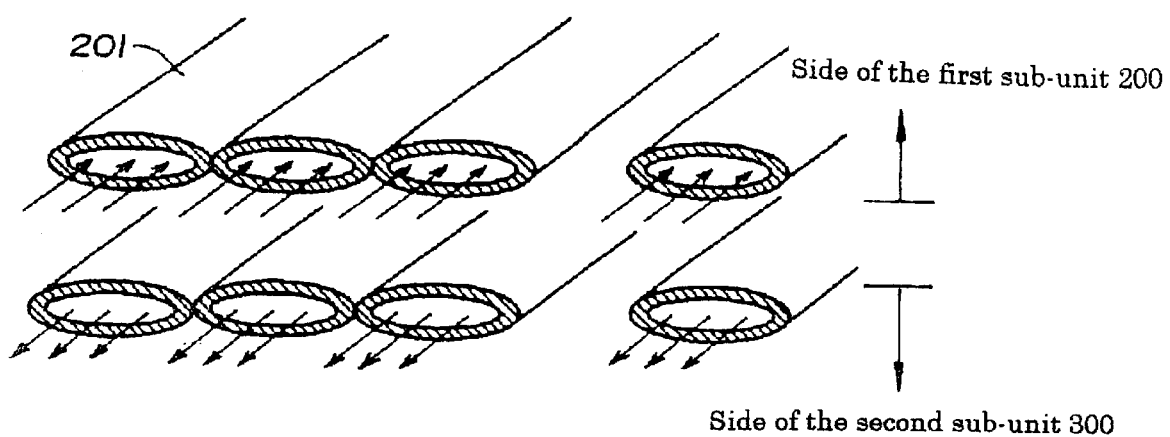
FIG. 13 is a cross sectional view taken along the line C—C of FIG. 12 to explain the direction of the eluent that flows in the flat tube.

FIG. 12 is a plane view to show an array of the flat tube, and FIG. 13 is a cross sectional view taken along the line C—C of FIG. 12 to explain the direction of the eluent that flows in the flat tube. As shown in FIG. 12, the flat tube 201 is spirally wound and arrayed in a flat form between the first sub-unit and the second sub-unit. How the flat tube is wound at the both edges of the first and second sub-units is as shown in FIG. 10.

The eluent flowing in the arrays of the flat tube goes in the opposite directions in the first sub-unit and the second sub-unit, as shown in FIG. 13.

Figure 14:
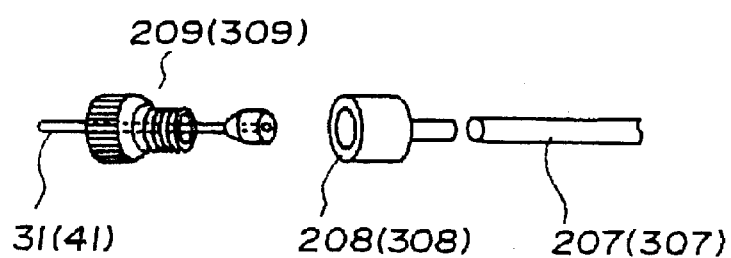
FIG. 14 shows an example of the structure of the connector combined with the eluent inlet and the outlet.
Figure 15:
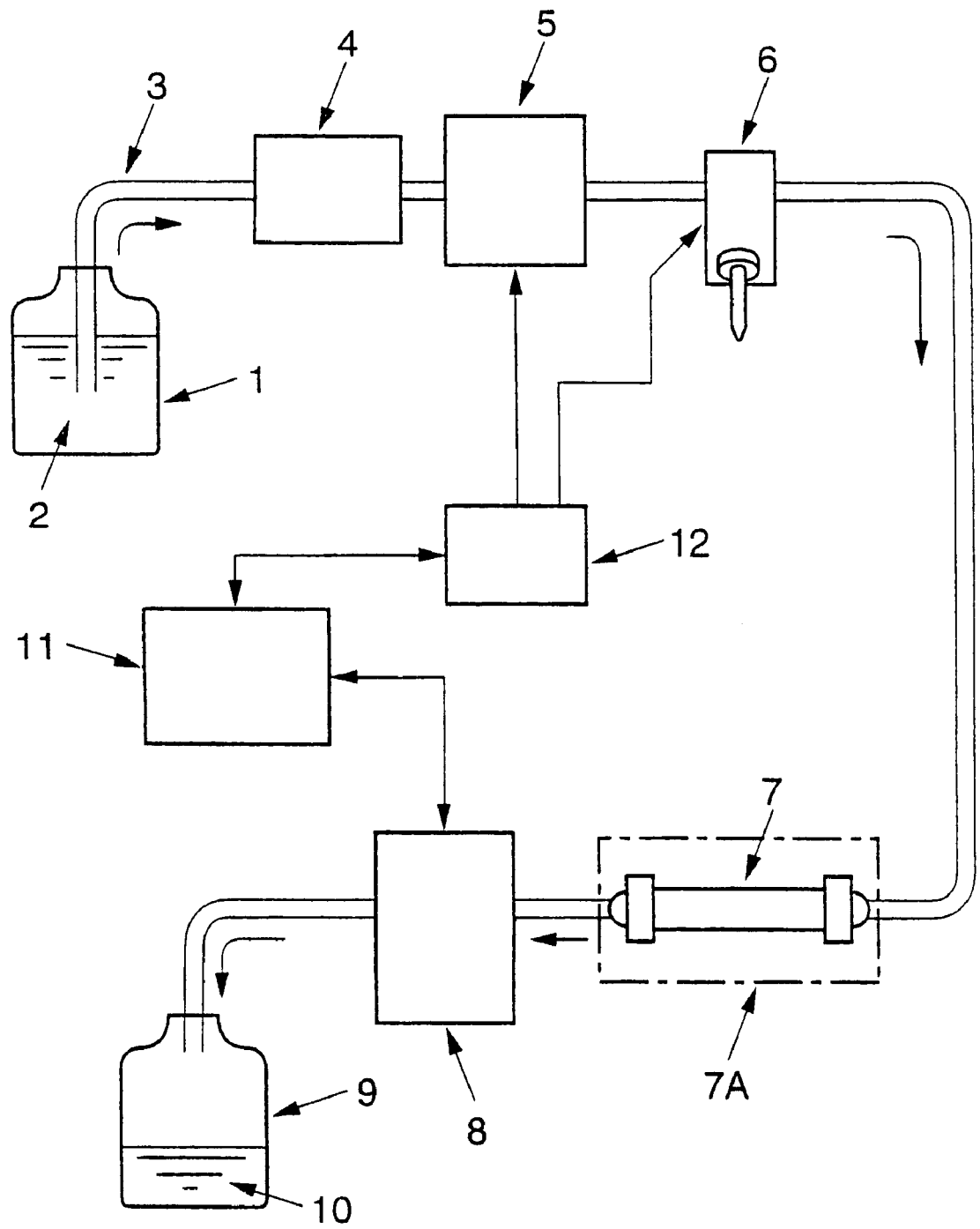
FIG. 15 is a block diagram to show a system configuration of HPLC.

FIG. 14 shows an example of the structure of connectors equipped at the eluent inlet 207 and the outlet 307. At the inlet 207 and the outlet 307 the flat tube 201 is round-shaped (its original shape). A connector 208 (or 308) is provided at the open end of the round tube and receives a main connector 209 (or 309) which is combined with an external pipe 31 (or 41).

In the degassing unit of this embodiment, the degassing module is characterized by such that no matter how small the channel gap of the said module is, it has nothing to do with the connectors.

Figure 17:
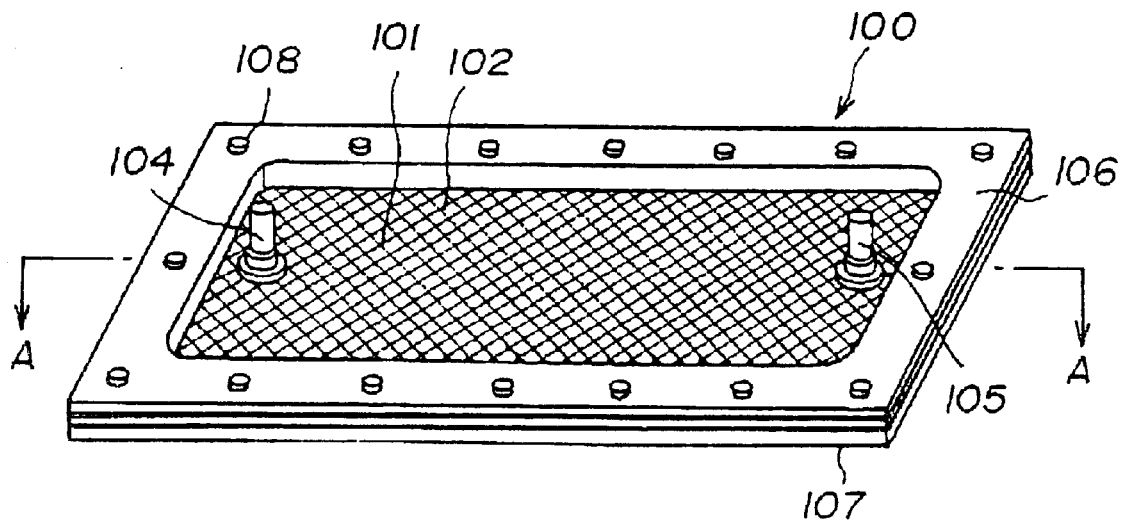
FIG. 17 illustrates a degassing module by the thin film type to explain another construction example of a conventional degassing unit.
Figure 18:
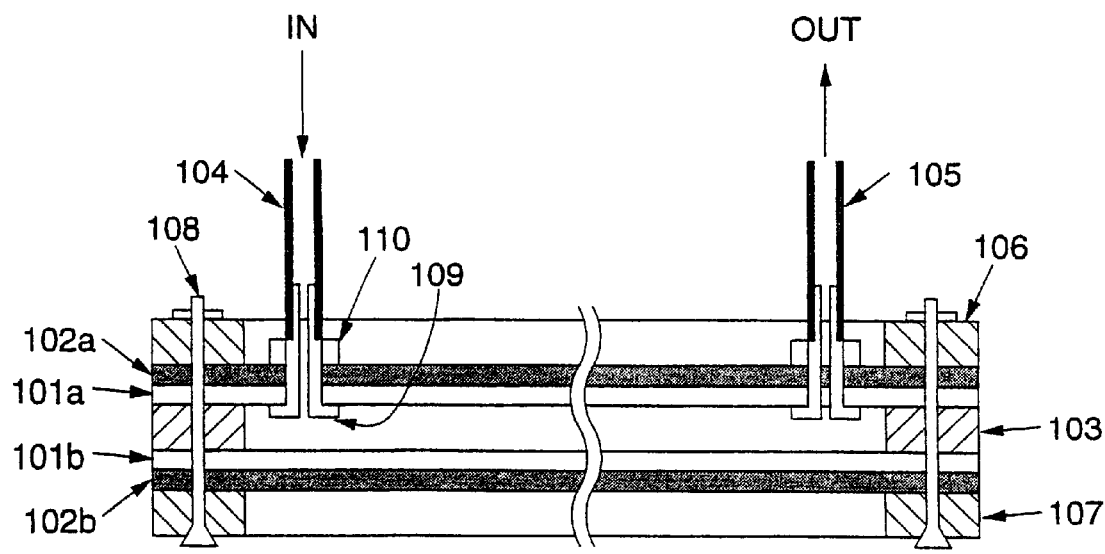
FIG. 18 is a cross sectional view of FIG. 17 taken along the line A—A in FIG. 17.

In the case of the degassing module that uses thin films as explained in FIG. 17 and FIG. 18, the channel gap is limited by the thickness of connector flanges. In the case of the embodiment of this invention, on the other hand, the connector is not limited by the size of the channel gap, as explained in the above clause.

A great improvement of efficiency can be attained by making the channel gap small, as previously explained. So, the performance of the degassing unit dramatically enhances when chromatographic analysis advances from semi-micro HPLC to micro HPLC.

In this invention, as the sub-units that constitute the degassing module can form an eluent flow pathway only by winding a flat tube, it is possible to easily manufacture a high-efficiency degassing unit without increasing the cost.

According to this invention in conclusion, it is possible to make a degassing module merely by winding a large-diameter tube having an originally round section, in place of a degassing module using a conventional round cross-section tube or thin film sheets, and also to supply a degassing unit with a wide range of flow speed, high-efficiency and compactness in size.

What is claimed:

1. In a degassing unit for high performance liquid chromatography installed between an eluent delivery pump and an eluent reservoir in order to remove gaseous components dissolved in eluent which is drawn from a reservoir by the eluent delivery pump and deliver the degassed eluent to a detection means including a separation column via a sample injection valve, the degassing unit consisting of both a degassing module composed of a gas permeable flat-shaped tube and a vacuum chamber containing this flat tube, and the degassing unit being characterized by such that by flowing said eluent through said flat tube which is a component of the degassing module, gaseous components dissolved in the eluent can be transpired from the flat tube to the vacuum chamber, thus being well removed.

2. The degassing unit of claim 1, wherein it is composed of an array of a spirally but flatly wound flat-shaped tube, mesh sheets mounted on the internal vacuum-space side of the flat tube and on the external vacuum-space side of it, a degassing module provided with a frame with which to fix the mesh sheets and the said array of the flat tube in a given form and a vacuum chamber that accommodates the internal and external vacuum spaces and the degassing module.

3. The degassing unit of claim 1, wherein it is configured in such a manner that a first sub-module and a second sub-module both of which consist of the flat tube arrayed between the two mesh sheets and two frames provided on both sides of and around the mesh sheets are fixed as an integrated component in a given distance with spacers, and that the flat tube consists of a single tube wound around the first sub-frame and the second sub-frame, and these sub-modules are accommodated in the vacuum chamber.

* * * * *